US010151827B2

(12) United States Patent
Sebastian et al.

(10) Patent No.: US 10,151,827 B2
(45) Date of Patent: Dec. 11, 2018

(54) LASER PHASE ESTIMATION AND CORRECTION

(71) Applicant: DSCG SOLUTIONS, INC., Chantilly, VA (US)

(72) Inventors: Richard Sebastian, Frederick, MD (US); Kendall Belsley, Falls Church, VA (US)

(73) Assignee: DSCG Solutions, Inc., Chantilly, VA (US)

( * ) Notice: Subject to any disclaimer, the term of this patent is extended or adjusted under 35 U.S.C. 154(b) by 375 days.

(21) Appl. No.: 14/807,508

(22) Filed: Jul. 23, 2015

(65) Prior Publication Data

US 2016/0025843 A1 Jan. 28, 2016

Related U.S. Application Data

(60) Provisional application No. 62/028,911, filed on Jul. 25, 2014.

(51) Int. Cl.
G01C 3/08 (2006.01)
G01S 7/491 (2006.01)
(Continued)

(52) U.S. Cl.
CPC .......... G01S 7/4915 (2013.01); G01S 7/4814 (2013.01); G01S 7/497 (2013.01); G01S 7/4911 (2013.01);
(Continued)

(58) Field of Classification Search
CPC ...... G01S 7/4814; G01S 7/4915; G01S 7/497; G01S 7/4911; G01S 17/325; G01S 17/36; G01S 17/58
(Continued)

(56) References Cited

U.S. PATENT DOCUMENTS 4,830,486 A * 5/1989 Goodwin ........... G01B 11/2441
250/559.38
6,618,404 B2 * 9/2003 Mattox .................. H01S 3/105
372/13
(Continued)

FOREIGN PATENT DOCUMENTS

JP 2017526911 A 9/2017
TW 466335 B 12/2001
(Continued)

OTHER PUBLICATIONS

Riebel et al, Ultra-broadband optical chirp linearization for precision length metrology applications , 2010, IEEE pp, 1-3.*
(Continued)

Primary Examiner — Mark Hellner
(74) Attorney, Agent, or Firm — Brake Hughes Bellermann LLP

(57) ABSTRACT

In one general aspect, a non-transitory computer-readable storage medium can be configured to store instructions that when executed cause a processor to perform a process. The process can include producing a segment of a laser signal where the segment of the laser signal has a duration, and producing a first reference signal based on the laser signal. The process can include calculating a first phase deviation corresponding with a first portion of the duration based on the first reference signal, and producing a second reference signal based on the laser signal. The process can include calculating a second phase deviation corresponding with a second portion of the duration based on the second reference signal, and calculating a phase deviation of the segment of the laser signal based on a combination of the first phase deviation and the second phase deviation.

15 Claims, 5 Drawing Sheets

(51) Int. Cl.
  *G01S 17/32* (2006.01)
  *G01S 17/36* (2006.01)
  *G01S 17/58* (2006.01)
  *G01S 7/497* (2006.01)
  *G01S 7/481* (2006.01)

(52) U.S. Cl.
  CPC ............ *G01S 17/325* (2013.01); *G01S 17/36* (2013.01); *G01S 17/58* (2013.01)

(58) Field of Classification Search
  USPC ........................................................ 356/4.01
  See application file for complete search history.

(56) References Cited

U.S. PATENT DOCUMENTS

| | | | | |
|---|---|---|---|---|
| 6,804,042 | B2 * | 10/2004 | Mattox | ............ H01S 3/105 359/285 |
| 2003/0021309 | A1 | 1/2003 | Mattox | |
| 2008/0088503 | A1 | 4/2008 | Beasley | |

FOREIGN PATENT DOCUMENTS

| | | |
|---|---|---|
| TW | 201330522 A1 | 7/2013 |
| WO | 2016014894 | 1/2016 |

OTHER PUBLICATIONS

International Search Report and Written Opinion for International Application No. PCT/US2015/041898, dated Nov. 3, 2015, 13 pages.

Reibel, Randy R. et al., "Ultra-broadband optical chirp linearization for precision length metrology applications", Optical Fiber Communication (OFC), Collocated National Fiber Optic Engineers Conference, IEEE, Mar. 21, 2010, 3 pages, XP031676961.

Barber, Zeb W. et al., "Accuracy of active chirp linearization for broadband frequency modulated continuous wave ladar", Applied Optics, Optical Society of America, vol. 49, No. 2, Jan. 10, 2010, 7 pages, XP001551149.

First Office Action for Taiwanese Application No. 104124152, dated Jan. 30, 2018, 5 pages.

International Preliminary Report on Patentability for PCT Application PCT/US2015/041898, dated Feb. 9, 2017, 9 pages.

* cited by examiner

LASER PHASE ESTIMATION AND CORRECTION

RELATED APPLICATION

This application claims priority to and the benefit of U.S. Provisional Application No. 62/028,911, filed on Jul. 25, 2014, and entitled, "LASER PHASE ESTIMATION AND CORRECTION", which is incorporated by reference herein in its entirety.

TECHNICAL FIELD

This description relates to a multi-reference laser LIght Detection And Ranging (LIDAR) system.

BACKGROUND

In some known LIDAR systems, lasers may be used to estimate range and velocity of moving objects. However, the range and velocity estimates can be distorted by, for example, phase deviation, frequency deviation, and/or other interference. Thus, a need exists for systems, methods, and apparatus to address the shortfalls of present technology and to provide other new and innovative features.

SUMMARY

In one general aspect, a non-transitory computer-readable storage medium can be configured to store instructions that when executed cause a processor to perform a process. The process can include producing a segment of a laser signal where the segment of the laser signal has a duration, and producing a first reference signal based on the laser signal. The process can include calculating a first phase deviation corresponding with a first portion of the duration based on the first reference signal, and producing a second reference signal based on the laser signal. The process can include calculating a second phase deviation corresponding with a second portion of the duration based on the second reference signal, and calculating a phase deviation of the segment of the laser signal based on a combination of the first phase deviation and the second phase deviation.

DETAILED DESCRIPTION

Figure 1:
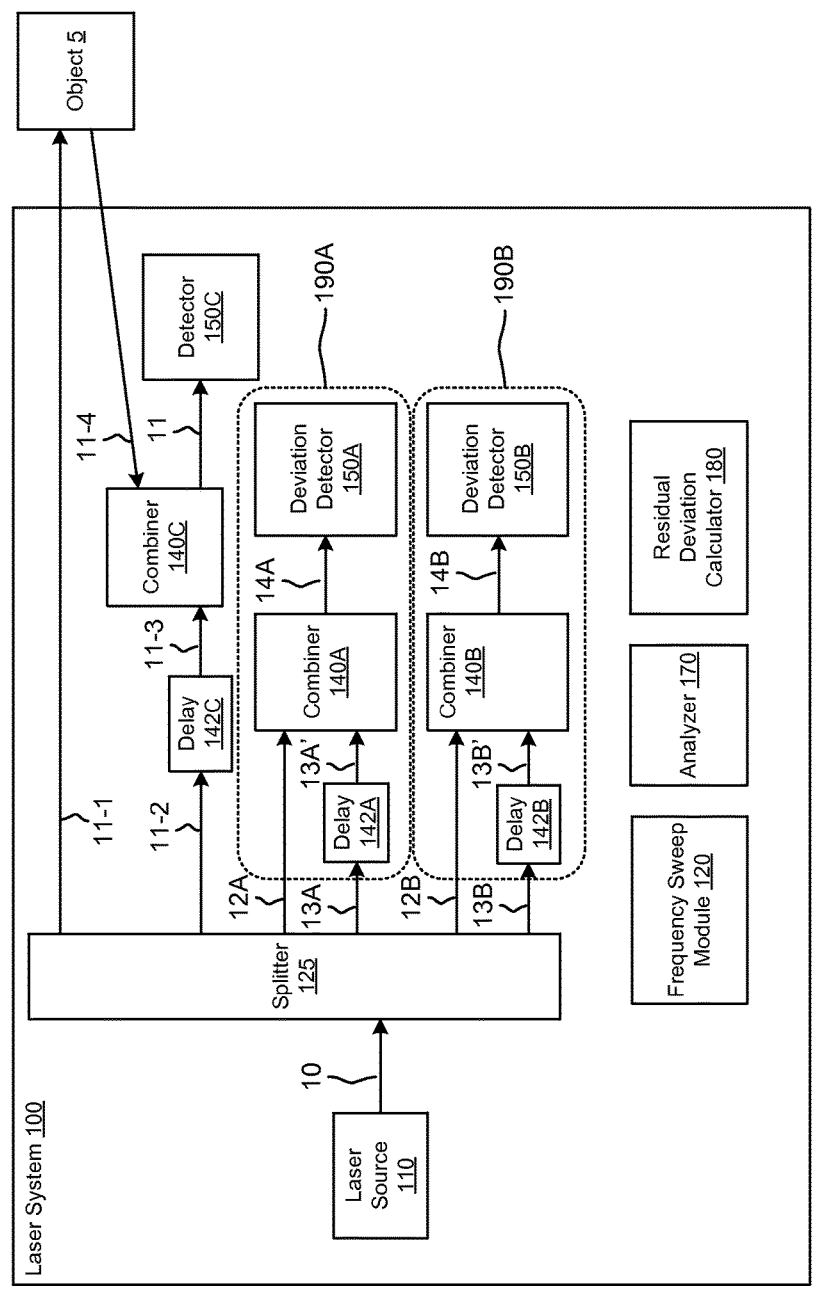
FIG. 1 is a diagram that illustrates a laser system.

FIG. 1 is a diagram that illustrates a laser system 100 (also can be referred to as a LIght Detection And Ranging (LIDAR) system) configured to use a laser source 110 to produce or measure a range and/or a velocity of an object 5 that can be stationary or moving with respect to the laser system 100. In some implementations, the object 5 can be referred to as a target or as a target object 5. The laser system 100 can be used in a frequency modulated continuous wave (FMCW) application.

The laser source 110 of the laser system 100 is configured to emit (e.g., produce, propagate) electromagnetic radiation at one or more frequencies that can be, for example, a coherent light emission (e.g., monochromatic light emission) or beam. For simplicity, the emissions from the laser source 110 will be referred to as an electromagnetic radiation emission (such as electromagnetic radiation emission), an emitted laser signal 10, or as an emitted light.

As shown in FIG. 1, the laser signal 10 can be split by the splitter 125 into multiple laser signals such as at least laser signals 11-1, 11-2, 12A, 12B, 13A, and 13B. The laser signals 12A, 12B, 13A, and 13B can be produced by the splitter 125 for processing by reference systems 190A, 190B, which each include an interferometer (which can include one or more photodetectors or detectors (e.g., detector 150C) configured to convert an optical signal into an electrical signal). In some implementations, the laser signal 11 can be derived from a split laser signal and can be referred to as combined laser signal. As shown in FIG. 1, an interferometer can be used to produce the laser signal 11, which may be analyzed for one or more corrections by an analyzer 170 (which can also be referred to as a demodulator). In such implementations, the laser signal 10 can be further split (e.g., by splitter 125) into laser signal 11-1 and laser signal 11-2. The laser signal 11-1 can be reflected from an object 5 as laser signal 11-4. Laser signal 11-2 can be delayed by a delay 142C (which can be correlated to a length) to laser signal 11-3 and laser signal 11-3 can be combined with the laser signal 11-4 via a combiner 140C. The laser signal 11 (also can be referred to as an interferometer signal) from the interferometer can be used to gather information about the laser signal 11 using a detector 150C. Discussions related to laser signal 11 below can be applied to any of the component laser signals 11-1 through 11-4 that can be used to define laser signal 11, which can be the target laser signal or the laser signal targeted for analysis by the analyzer 170. The splitter 125 is illustrated as a single component for simplicity. In some implementations, the splitter 125 can include more than one splitter. Similarly one or more of the combiners shown in FIG. 1 may be combined or may include additional combiners.

As shown in FIG. 1, the laser system 100 includes a frequency sweep module 120. The frequency sweep module 120 is configured to trigger the laser source 110 to produce a variety of optical frequencies (also can be referred to generally as frequencies), for example, by modulating a drive current of the laser source 110. Specifically, the frequency sweep module 120 is configured to trigger laser source 110 to produce a pattern of optical frequencies (also can be referred to as a frequency pattern). For example, the frequency sweep module 120 can be configured to trigger the laser source 110 to produce a sinusoidal wave pattern of optical frequencies, a sawtooth wave pattern of optical frequencies, and/or so forth. In some implementations, the sawtooth wave pattern can have a portion continuously increasing (e.g., monotonically increasing, linearly increasing, increasing nonlinearly) in optical frequency (also can be referred to as up-chirp) and can have a portion continuously decreasing (e.g., monotonically decreasing, linearly decreasing, decreasing nonlinearly) in optical frequency (also can be referred to as down-chirp). Accordingly, the frequency pattern can have a cycle including an up-chirp and a down-chirp.

The laser system 100 includes a combiner 140C configured to receive the laser signal 11-4 reflected (also can be referred to as a reflected laser signal or as a scattered laser signal) (not shown) from the object 5 in response to an emitted laser signal 11-1 (split from laser signal 10) from the laser source 110 toward the object 5. In some implementations, the reflected laser signal (also can be referred to as a return signal or return light) from the object 5 can be mixed with a portion of the emitted laser signal 10 (e.g., laser signal 11-3 delayed by delay 142C) and then analyzed by the analyzer 170 (after being converted to an electrical signal by detector 150C).

The analyzer 170 of the laser system 100 is configured to analyze a combination of emitted laser signal 11-1 from the laser source 110 and reflected laser signal 11-4 received by the combiner 140C. The emitted laser signal 11-1 can be emitted in accordance with a pattern including an up-chirp followed by a down-chirp (or a down-chirp followed by an up-chirp). The combination of a frequency of the emitted laser signal 11-1 from the laser source 110 and a frequency of the reflected laser signal 11-4 received by the combiner 140C can be analyzed by the analyzer 170 to obtain or define a beat frequency or signal. In other words, the beat frequency can be a sum of a signal frequency change over the round trip to the object 5 (emitted laser signal) and back (reflected laser signal), and may include a Doppler frequency shift of the reflected laser signal resulting from relative range motion between the laser system 100 and the object 5. In some implementations, the beat signal can have a relatively constant frequency or a varying frequency. In some implementations, a combination of a frequency of emitted laser signal 11-1 and a frequency of reflected laser signal 11-4 can be referred to as a difference frequency, a beat frequency or as a round-trip frequency.

The analyzer 170 can be configured to calculate a round-trip time period, which is a time period from the emission of the laser signal 10 to receipt of the return of the reflected laser signal. A combination of the emitted later signal 11-1 and the reflected laser signal 11-4 can collectively be referred to as a round-trip laser signal. The analyzer 170 can also be configured to calculate a range and/or a velocity based on the combination of the emitted laser signal 11-1 and the reflected laser signal 11-4.

The optical power of the laser output can change significantly during a frequency pattern such as a frequency sweep or up-chirp/down-chirp as a result of, for example, drive current modulation of the laser source 110. The frequency pattern may be non-ideal (e.g., may deviate) from a specified frequency pattern because of an imperfect drive current signal, unavoidable thermal excitations in the laser source 110, and/or so forth that can cause variations, for example, frequency, phase, and/or so forth.

The laser system 100 includes reference systems 190A, 190B configured to produce reference signals that can be used to correct for, for example, frequency deviations, phase deviations, etc. in one or more laser signals produced by the laser source 110. In other words, the reference systems 190A, 190B included in the laser system 100 can be configured to facilitate compensation for deviations (e.g., non-linearities, non-idealities, errors) in a frequency pattern of, for example, the emitted laser signal 11-1, a reflected laser signal 11-4, a round-trip laser signal, and/or so forth, from the laser system 100. The reference systems 190A, 190B can be used to achieve a near ideal, or ideal, FMCW LIDAR implementation. Specifically, the reference systems 190A, 190B can be used to correct for deviations to obtain a relatively constant beat frequency. Laser signals that are targeted for correction (e.g., adjustment) by the reference systems 190A, 190B can be referred to as target laser signals and can include at least the emitted laser signal 10 (or a signal derived therefrom), a reflected laser signal (or a signal derived therefrom), and a round-trip laser signal (or a signal derived therefrom).

Each of the reference systems 190A, 190B is configured to define, respectively, a reference signal 14A, 14B that can be used to determine (e.g., identify, calculate) deviations in one or more target laser signals (e.g., laser signal 11). The laser signal 10 can be split by the splitter 125 into laser signal 12A, 12B for processing by the reference systems 190A, 190B. The reference signal 14A can be produced based on a combination (using combiner 140A) of the laser signal 12A and a delayed laser signal 13A' produced based on the laser signal 13A. Similarly, the reference signal 14B can be produced based on a combination (using combiner 140B) of the laser signal 12B and a delayed laser signal 13B' produced based on the laser signal 13B. In other words, the reference signals 14A, 14B can be beat signals produced respectively, by the combination of the laser signal 12A and the delayed signal 13A' and by the combination of the laser signal 12B and the delayed signal 13B'. The delayed signals 13A', 13B' are produced through delays 142A, 142B, respectively. The delays 142A, 142B can each be referred to as a fixed delay or reference arm lengths, and the reference signals 14A, 14B can be referred to as reference arm signals. Each of the delays 142A, 142B can be configured to define a delay time period, and can be part of (e.g., included in) an interferometer.

The deviation detectors 150A, 150B can be configured to determine deviations associated with the reference signals 14A, 14B, respectively. In some implementations, the deviation detectors 150A, 150B can be combined into a single module or divided into multiple modules. In some implementations, one or more of the deviation detectors 150A, 150B can be configured to detect a variety of deviations including phase shifts, and so forth. One or more of the deviation detectors 150A, 150B can include, or can be, a photodetector.

Because the analyzer 170 may not be configured to directly measure deviations of the one or more target laser signals, the reference systems 190A, 190B can be configured to measure deviations (e.g., using the deviation detectors 150A, 150B) of time segments of the reference signals 14A, 14B that can correspond with time segments of the one or more target laser signals (e.g., laser signal 11). In some implementations, a time signal associated with a target laser signal can be referred to as a target time segment. For example, the reference systems 190A, 190B can be configured to measure laser phase time history of time segments of the reference signals 14A, 14B that correspond with time segments of one or more target laser signals. In general, the phase time history of the Hilbert transform of the reference signals 14A, 14B can be used to correct the deviations of the phase time history of one or more target laser signals so that the corrected target laser signal(s) can be a desirable tone from which a desirable frequency determination may be made.

Figure 2:
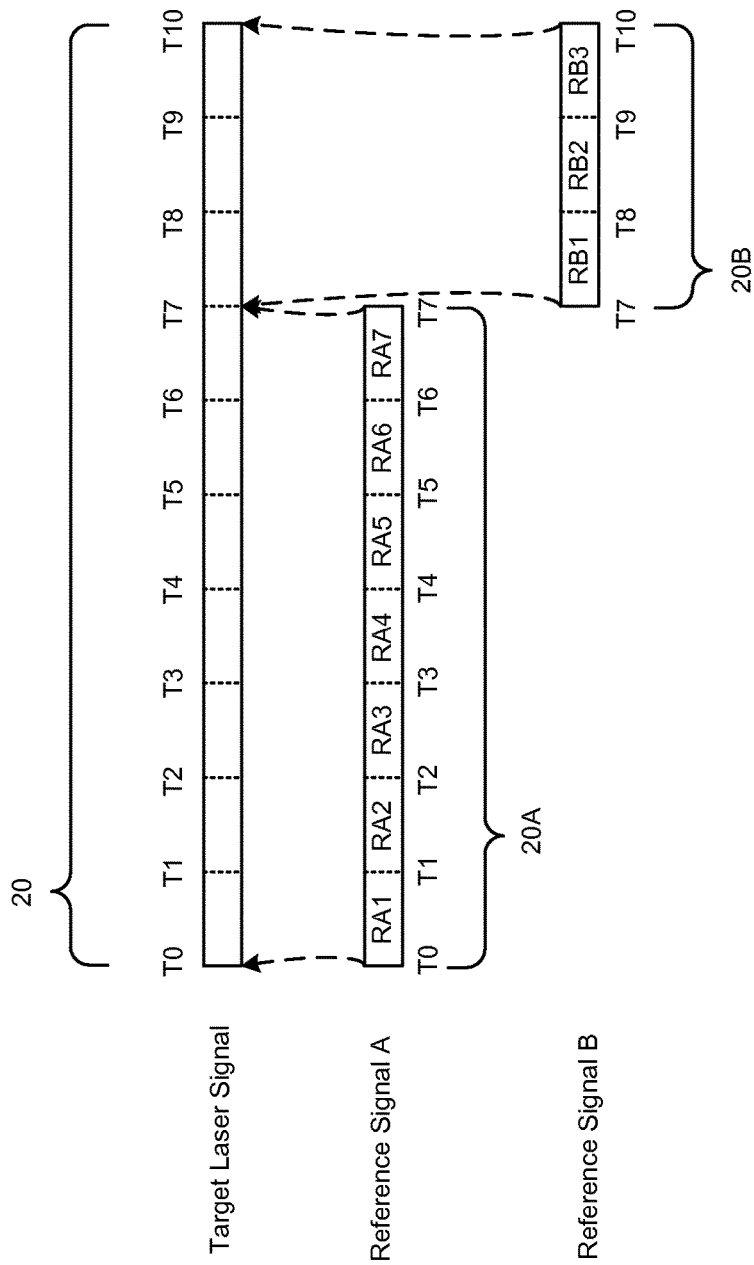
FIG. 2 illustrates a target laser signal that is targeted for correction for a deviation.
Figure 3:
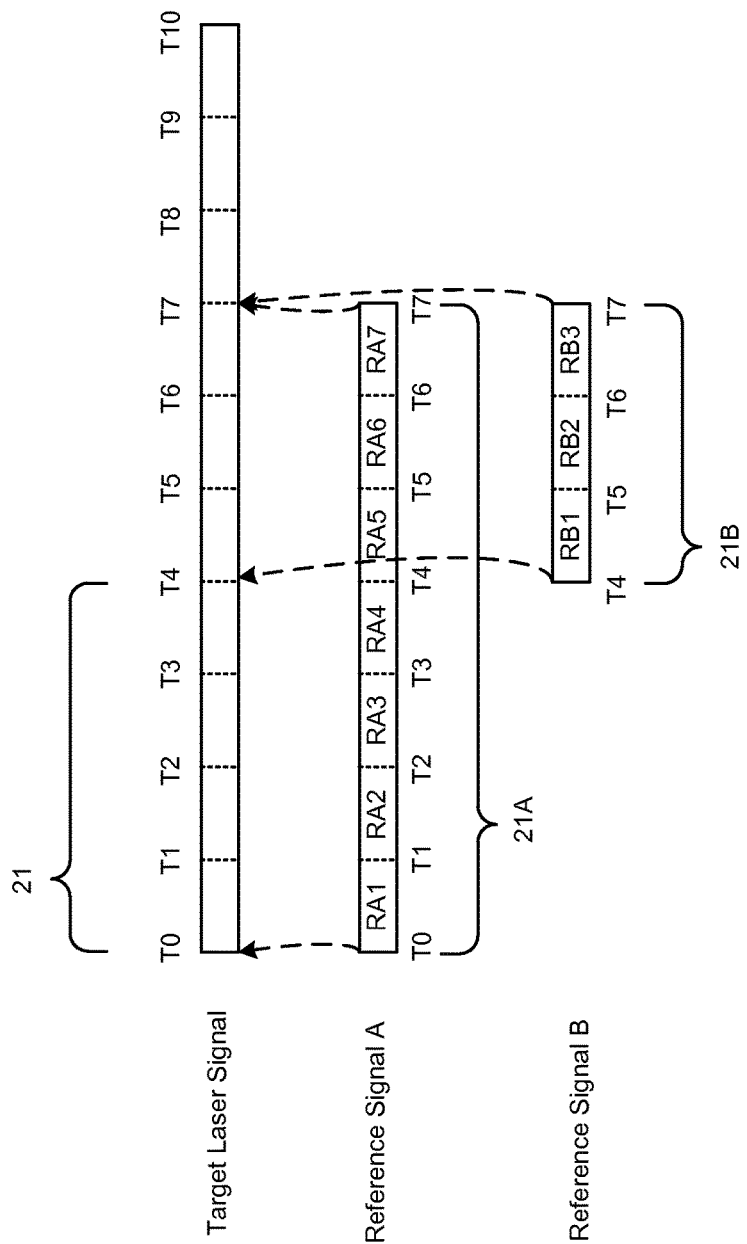
FIG. 3 illustrates another example of the target laser signal shown in FIG. 2 that is targeted for correction of a deviation.

In this implementation, multiple reference systems—reference systems 190A, 190B—are used to measure deviations of different time segments. Specifically, the delay 142A can be different from the delay 142B, so that the reference signals 14A and 14B will be associated with different time segments (or delay time periods). Accordingly, deviations associated with each of the different time segments can be used in a variety of mathematical combinations to determine (e.g., calculate) in a relatively accurate fashion a deviation of yet another time segment of one or more target signals. Examples of this concept are illustrated in FIGS. 2 and 3. The multiple reference system included in the laser system 100 has many advantages over a single reference signal processing system or method because a single reference signal processing system may, for example, make assumptions about phase history to estimate laser phase time history.

FIG. 2 illustrates a target laser signal that is targeted for correction for a deviation. For example, the target laser signal has time segment 20 during a time duration between time T0 and time T10 that is targeted for analysis. A first deviation can be determined (e.g., measured, calculated) with time segment 20A that occurs between time T0 and T7 for reference signal A and a second deviation can be determined for time segment 20B that occurs between time T7 and T10 for reference signal B. Accordingly, the overall deviation of the time segment 20 associated with the target laser signal can be determined by combining (e.g., summing, concatenating) the deviations associated with time segment 20A and time segment 20B.

FIG. 3 illustrates another example of the target laser signal shown in FIG. 2 that is targeted for correction of a deviation. This example is a variation of the example illustrated in FIG. 2. In this implementation, the target laser signal has time segment 21 during a time duration between time T0 and time T4 that is targeted for analysis. A first deviation can be determined (e.g., measured, calculated) with time segment 21A that occurs between time T0 and T7 for reference signal A and a second deviation can be determined for time segment 21B that occurs between time T4 and T7 for reference signal B. Accordingly, the overall deviation of the time segment 20 associated with the target laser signal can be determined by combining, which in this case is subtracting, the deviations associated with time segment 21A and time segment 21B.

Referring back to FIG. 1, the time segments associated with the reference systems 190A, 190B can correspond with a sampling rate of the analyzer 170. In some implementations, the time segments can correspond with integer multiples (also can be referred to as integral numbers) of sampling intervals or sampling time periods. For example, the sampling rate of the analyzer 170 can include a sampling time period of a few nanoseconds. The delay 142A can be defined to correspond with an integer multiple of the sampling time period (e.g., 5 integer multiples×5 ns sampling time period=25 ns delay) such that a deviation associated with the reference signal 14A can be associated with a time segment that corresponds with the integer multiple of the sampling time period. By doing so the deviations associated with time segments of the reference signals 14A, 14B can be matched to time segments of sampling time periods associated with one or more target signals. Accordingly, the deviation of a time segment of a target laser signal can be accurately determined.

An example of sampling time periods is illustrated in at least, for example, FIG. 2. As shown in FIG. 2, the time period between time T0 and T1 can correspond with a sampling time period. Accordingly, the segment 20 of the target laser signal can include ten sampling time periods. Also as shown in FIG. 2, the segment 20A includes seven sampling time periods RA1 through RA7, and the segment 20B includes seven sampling time periods RB1 through RB3. Thus, the segment 20A of the reference signal A can be matched with the sampling time periods from time T0 through time T7 of the segment 20 of the target laser signal, and the segment 20B of the reference signal B can be matched with the remaining sampling time periods from time T7 through time T10 of the segment 20 of target laser signal. Accordingly, a deviation of the time segment 20 of the target laser signal can be accurately determined based on the deviations of the segment 20A, 20B because of the segment duration correspondence or matching.

Referring back to FIG. 1, the delays associated with the reference systems 190A, 190B can have a difference based on one or more sampling time periods. Specifically, the delay 142A and the delay 142B can be separated by an integer multiple of a sampling time period (e.g., sampling interval). For example, as shown in FIG. 2, the segment 20A can be different from the segment 20B by four sampling time periods.

In some implementations, one or more of the delays 142A, 142B can have a delay time period that is a prime number of sampling time periods. In some implementations, the delays 142A, 142B can be defined with delay time periods that do not have a common factor.

In some implementations, with a non-zero deviation (e.g., phase measurement deviation), the longer of delay time periods of the two reference systems 190A, 190B may a have delay based on the ratio (range (distance)–LO (length))/(long reference arm length). The range is the round trip delay to the object 5, and the LO length is a length correlated to the delay 142C. The (range–LO) term can represent a length difference associated with an interferometer signal derived from the laser signal 10. In other words, the range term can be a length associated with the laser signal 10 that may include the distance to a target (e.g., object 5), and may be a round-trip distance, and the LO term can be a length associated with a delayed version of the laser signal 10. Accordingly, the (range–LO) can represent a length derived from a beating of the laser signal 10 and a delayed version of the laser signal 10. In some implementations, the ratio can be, or should be, less than 10. The two references can be used to effectively concatenate, for example, deviation difference (e.g., phase difference) measurements for relatively short time periods to obtain phase difference estimates for relatively long time periods. In some implementations, fewer short time measurements concatenated together may be desirable for an accurate long range measurement.

Also, in some implementations, the shorter of the delay time periods associated with the two reference systems 190A, 190B may be short enough that a relatively short time delay period deviation may be estimated accurately, and a relatively small number of measurements may be used to estimate the deviation of a given (range–LO) length. Of the reference systems 190A, 190B with the shorter delay (or length), the shorter delay (e.g., delay 142A, delay 142B) may be large enough that the root mean square (RMS) phase measurement error (e.g., error due to noise) of, for example, laser signal 14B is small compared to the measured RMS phase deviation due to imperfections in the laser source 110.

In some implementations, the deviation detectors 150A, 150B can be configured to determine (e.g., calculate, measure) deviations for time segments that correspond with the sampling time periods. In other words, deviations can be measured for time segments starting at more than one sampling time period. Accordingly, deviations can be measured for time segments of a target laser signal having a variety of durations and starting at different times (e.g., sampling times).

In some implementations, deviations for a segment of a target laser signal can be determined based on deviations associated with multiple segments (e.g., concatenated segments, overlapping segments) measured using a single reference system. For example, a deviation detector can be configured to measure a first deviation associated with a first time segment starting at a first time using a reference system having a delay. The deviation detector can be configured to measure a second deviation associated with a second time segment starting at a second time, different from the first time period, using the same reference system having the same delay. In some implementations, the first time segment can be mutually exclusive with the second time segment. In some implementations, the first time segment can have overlap with the second time segment. The overlap in the segments can occur, in particular, when measuring a residual deviation. Residual deviations are discussed in more detail in connection with, for example, at least FIG. 5.

Figure 4:
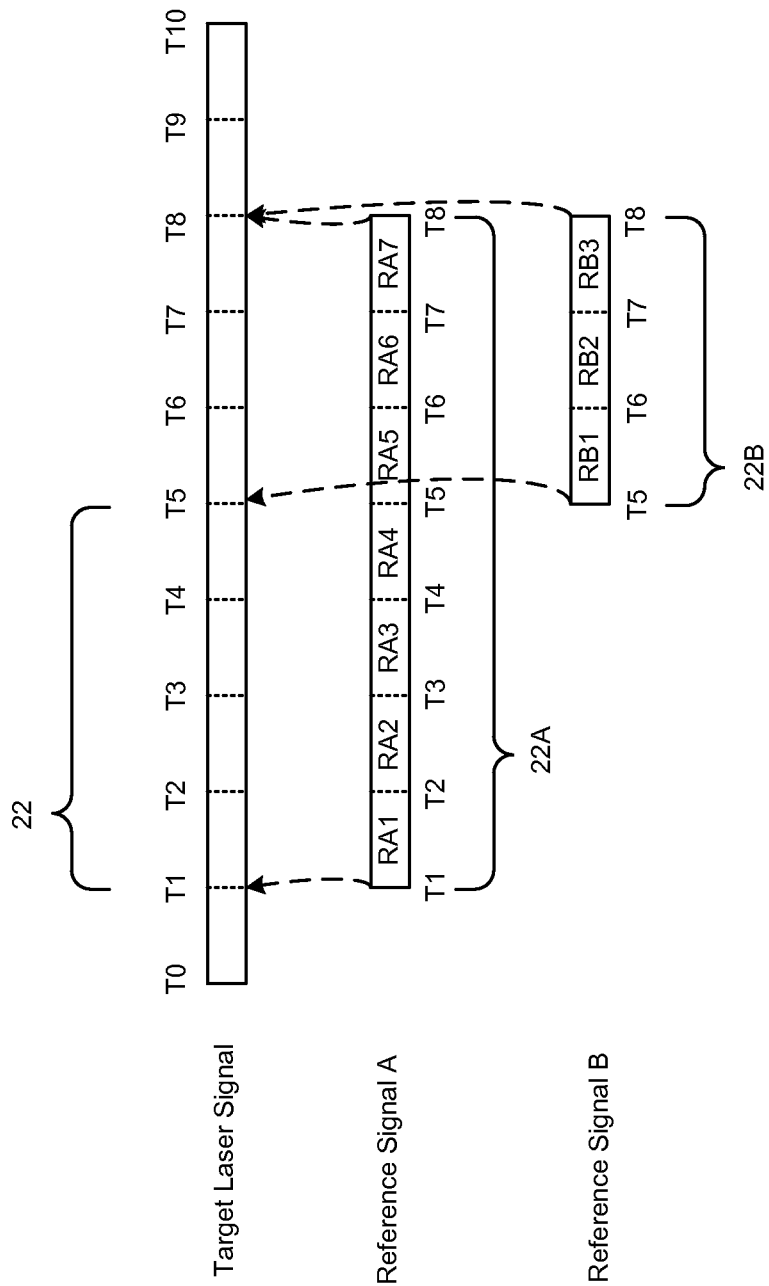
FIG. 4 illustrates another example of a shift in time segments of the target laser signal shown in FIG. 3.

FIG. 4 illustrates another example of a shift in time segments of the target laser signal shown in FIG. 3. As shown in FIG. 4, the time segment 22A is shifted by one sample time period from the time segment 21A shown in FIG. 3. Similarly, the time segment 22B is shifted by one sample time period from the time segment 21B shown in FIG. 3B. Accordingly, deviations associated with time segment 22A and 22B can be used to determine a deviation associated with time segment 22, which is shifted by one sampling time period from time segment 21 shown in FIG. 3. Additional time segments associated with reference signal A or associated reference signal B are not shown in FIG. 4.

Referring back to FIG. 1, in some implementations, an overall deviation associated with a time segment of a target laser signal can be determined based on a deviation detected using only one of the reference systems 190A, 190B. For example, two or more deviations associated with two or more time segments associated with the reference signal 14A of the reference system 190A can be used in combination to determine an overall deviation associated with a time segment of the target laser signal.

In some implementations, time segments associated with the reference systems 190A, 190B may not be matched in a desirable fashion with a time segment of a target laser system. In such instances, a residual deviation calculator 180 included in the laser system 100 shown in FIG. 1 can be configured to calculate, using a variety of methods (e.g., an average, a truncated portion), a residual deviation based on one or more of the time segments associated with the reference systems 190A, 190B. Such an example is illustrated in FIG. 5.

Figure 5:
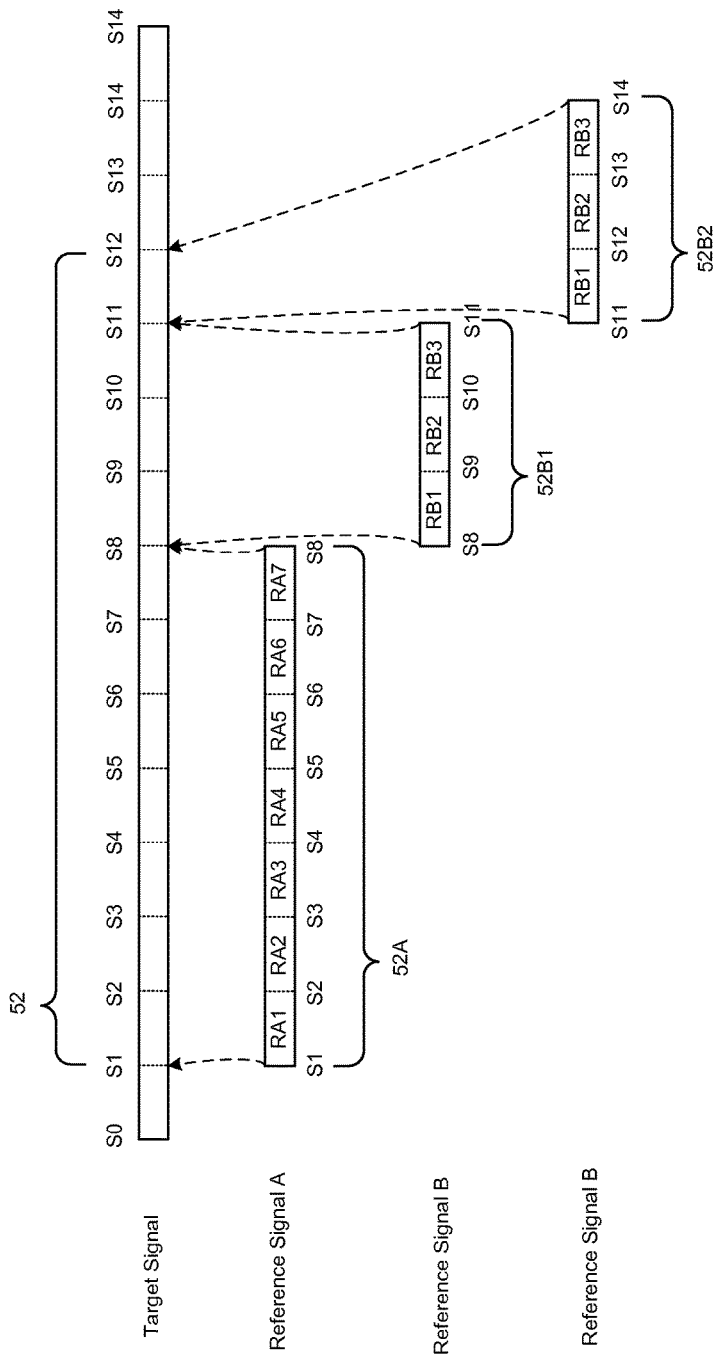
FIG. 5 is a diagram that illustrates another example of a target laser signal according to an implementation.

FIG. 5 is a diagram that illustrates another example of a target laser signal according to an implementation. As shown in FIG. 5, the target laser signal has a target time segment 52 between times S1 and S12. A deviation associated with a time segment 52A of a reference signal A can be used to determine a deviation associated with a first portion of the target time segment 52 between times S1 and S8, and a deviation associated with a time segment 52B1 of a reference signal B can be used to determine a second portion of the target time segment 52 between times S8 and S11. The combination of the time segment 52A and the time segment 52B1 leaves a remainder (or residual portion) in the target time segment 52 between S11 and S12. In this implementation, a deviation associated with a time segment 52B2 of the reference signal B can be used to determine a deviation associated with the residual portion of the target time segment 52 between times S11 and S12. The deviation associated with the residual portion of the target time segment 52 can be referred to as a residual deviation. In some implementations, a fraction (or portion) of the deviation or a per sample time average of a deviation associated with the time segment 52B2 can be used to estimate the deviation (or residual deviation) associated with the residual portion of the target time segment 52 between times S11 and S12. In some implementations, a segment used to calculate (or estimate) the residual deviation associated with the residual portion of the target time segment 52 can be centered about the times S11 and S12. For example, a deviation (or a portion thereof) associated with a time segment between times S10 and S13 of reference signal B can be used to estimate the residual deviation associated with the residual portion of the target time segment 52 can be centered about the times S11 and S12 In some implementations, the deviation can be calculated using a residual deviation calculator such as the residual deviation calculator 180 shown in FIG. 1.

Using properly constructed reference arms (e.g., reference systems 190A, 190B shown in FIG. 1), within reference arm phase measurement deviation, the (range–LO) delay phase time history may be estimated accurately (e.g., perfectly), to the nearest sample length. The deviation in subsample phase estimation will, in general, be relatively small because one sample period is small compared with 1/(laser line width) and laser changes within that period should be small.

Below is an example of (range–LO) phase time history estimation

Assume

Ref15 has a 15 sample delay

Ref7 has a 7 sample delay

Then, with the right integer delay the Ref15 phase time series may be added to the Ref7 phase time series to synthesize a Ref22 time series. If measuring a target at a range for which the (range–LO) delay time was near 22 sample periods, the synthetic Ref22 conjugated and beat against the target return signal would yield a nearly perfect tone for spectrum processing.

Particulars of the implementation are set forth below:

Laser phase signal: phi(t)

$$phi(t)=phi0+w0*t+\text{alpha}*t^2+V(t) \qquad (1),$$

where t is time, phi0 is the phase at time 0, w0 is the optical frequency at time 0, alpha is a constant defining the chirp rate, and V(t) represents the deviation, or non linearity, of the laser frequency sweep The reference arm phase signal is given by $$R(t, \text{tau}) = \text{phi}(t) - \text{phi}(t - \text{tau}) \qquad (2)$$
$$= w0*\text{tau} + (2*\text{alpha}*\text{tau})*t - \text{alpha}*\text{tau}^2 +$$
$$v(t) - v(t - \text{tau})$$
$$= [w0*\text{tau} - \text{alpha}*\text{tau}^2] + [2*\text{alpha}]*\text{tau}*t +$$
$$v(t) - v(t - \text{tau}),$$

where tau is the time difference between the two lengths, or the delay, in the interfermoter.

The following is defined:

$$K(\text{tau})=[w0*\text{tau}-\text{alphetau}^2]=\text{constant phase term}$$

$$2*\text{alpha}=2*\text{pi}*(\text{chirp rate})=2*\text{pi}*\text{hzpm}*c=H,$$

where hzpm is the hertz per meter of path imbalance, and c is the speed of light in the propagation medium chirp rate(hz/sec)=hzps=hzpm*c $$R(t,\text{tau})=K(\text{tau})+H*\text{tau}*t+v(t)-v(t-\text{tau}) \quad (3)$$

Now consider a discrete time sequence:

$$t(j)=tSamp*j,$$

where tSamp is the sample time.

Also consider a reference arm cut to obtain discrete travel time length tSamp*k $$R(j,k) = R(j*tSamp, k*tsamp) \quad (4)$$
$$= K(\text{tau}*tSamp) + H*k*tSamp^{\wedge}2*j + v(j) - v(j-k)$$

If we complex heterodyne to baseband, ignoring constants, we have:

$$R0(j,k)=v(j)-v(j-k) \quad (5)$$

Suppose we have two actual references corresponding to delay indices k and m. Then $$R0(j,k) + R0(j-k,m) = v(j) - v(j-k) + v(j-k) - v(j-k-m) \quad (6)$$
$$= v(j) - v(j-(k+m)) = R0(j, k+m)$$

We have exactly synthesized R0(j,k+m) using R0(j,k) and R0(j,m)

Similarly, $$R0(j,k) - R0(j-k+m,m) = v(j) - v(j-k) - v(j-(k-m)) + \quad (7)$$
$$v(j-(k-m)-m)$$
$$= v(j) - v(j-(k-m)) = R(j,k-m)$$

Theorem:

Given a third integer n, for any two non zero integers k and m that are relatively prime (contain no common factors), there exist integer factors A and B such that $$n=A*k+B*m \quad (8)$$

As a result, generalizing, we can synthesize a reference arm signal of arbitrary integer sample length from two integer sample length reference arms whose integers are relatively prime. The only deviation may be measurement noise.

Approximate reference segment estimation—Because measurement noise cannot be neglected, it may sometimes make sense to approximate some reference length segment components rather than using exact implementations involving large factor integers A and/or B. For example, a reference length segment of 13 samples may be approximated using a 15 sample reference arm and selecting sample indices so that the 13 samples are centered in the 15 samples. The 13 sample phase difference is estimated as (13/15) times the 15 sample measured phase difference. Similarly, a 17 sample reference segment phase difference may be estimated as (17/15) times the phase difference of a measured 15 sample reference with the same center sample segment.

It can be shown that for a reference pair of lengths k and m, the maximum number of segments (sum of abs(A) and abs(B) in equation (8)), required to exactly synthesize an integer sample reference of length less than k*m is $$\text{maxSegments}=[(k-1)+(m-1)], \quad (9)$$

which is a larger number than desirable. By allowing the option of segment lengths [(k−2),k,(k+2),(m−2),m,(m+2)] the maximum number of reference segment phase measurements is greatly reduced. For example, in order to synthesize any integer sample reference of length 1 to 100 samples, using segments of length [5,7,9,13,15,17], the maximum number is 7. For 1 to 50 samples, the maximum number is 4. In practice, we will have modeled and empirical reference phase measurement deviation and approximate length measurement deviation estimates and select exact and approximate segments accordingly to minimize deviation. In all circumstances minimum deviation will be better than that obtained by known HS processing.

If a system is to be used to regularly measure long range, longer reference arms and LO's are in order.

This seemingly complex synthetic reference arm estimation process is actually fairly simple to implement and yields a significant performance advantage over existing HS processing implementations. In addition to consistent SNR improvement, there should be a reduction in up chirp and down chirp differences for velocity and range estimates.

Below are the results for an example 1 to 100 sample length reference. In this compilation no preference is given for exact segments over approximate segments. This will be added once good estimates are available for deviations for exact segments and approximate segments.

**twoRefsModel**
nSegRef1=15 nSegRef2=7
sigmaP=0.025 sigmaM=0.050
nSegRange=1
1=−6*15+13*7 totSegs=19 ErrMeas=0.218
1=1*15+−2*7 totSegs=3 ErrMeas=0.087
nSegRange=2
2=−5*15+11*7 totSegs=16 ErrMeas=0.200
2=2*15+−4*7 totSegs=6 ErrMeas=0.122
2=−1*15+0*7+0*13+1*17+0*9+0*5 GSegs=1 ASegs=1 totSegs=2
nSegRange=3
3=−4*15+9*7 totSegs=13 ErrMeas=0.180
3=3*15+−6*7 totSegs=9 ErrMeas=0.150
3=−1*15+0*7+0*13+0*17+2*9+0*5 GSegs=1 ASegs=2 totSegs=3
nSegRange=4
4=−3*15+7*7 totSegs=10 ErrMeas=0.158
4=4*15+−8*7 totSegs=12 ErrMeas=0.173
4=0*15+0*7+−1*13+1*17+0*9+0*5 GSegs=0 ASegs=2 totSegs=2
nSegRange=5
5=−2*15+5*7 totSegs=7 ErrMeas=0.132
5=5*15+−10*7 totSegs=15 ErrMeas=0.194
5=0*15+0*7+0*13+0*17+0*9+1*5 GSegs=0 ASegs=1 totSegs=1
nSegRange=6
6=−1*15+3*7 totSegs=4 ErrMeas=0.100
6=6*15+−12*7 totSegs=18 ErrMeas=0.212
6=0*15+−1*7+1*13+0*17+0*9+0*5 GSegs=1 ASegs=1 totSegs=2
nSegRange=7
7=0*15+1*7 totSegs=1 ErrMeas=0.050
nSegRange=8
8=−6*15+14*7 totSegs=20 ErrMeas=0.224
8=1*15+−1*7 totSegs=2 ErrMeas=0.071 nSegRange=9
9=−5*15+12*7 totSegs=17 ErrMeas=0.206
9=2*15+−3*7 totSegs=5 ErrMeas=0.112
9=0*15+0*7+0*13+0*17+1*9+0*5 GSegs=0 ASegs=1 totSegs=1
nSegRange=10
10=−4*15+10*7 totSegs=14 ErrMeas=0.187
10=3*15+−5*7 totSegs=8 ErrMeas=0.141
10=0*15+−1*7+0*13+1*17+0*9+0*5 GSegs=1 ASegs=1 totSegs=2
nSegRange=11
11=−3*15+8*7 totSegs=11 ErrMeas=0.166
11=4*15+−7*7 totSegs=11 ErrMeas=0.166
11=−1*15+0*7+0*13+1*17+1*9+0*5 GSegs=1 ASegs=2 totSegs=3
nSegRange=12
12=−2*15+6*7 totSegs=8 ErrMeas=0.141
12=5*15+−9*7 totSegs=14 ErrMeas=0.187
12=0*15+0*7+0*13+1*17+0*9+−1*5 GSegs=0 ASegs=2 totSegs=2
nSegRange=13
13=−1*15+4*7 totSegs=5 ErrMeas=0.112
13=6*15+−11*7 totSegs=17 ErrMeas=0.206
13=0*15+0*7+1*13+0*17+0*9+0*5 GSegs=0 ASegs=1 totSegs=1
nSegRange=14
14=0*15+2*7 totSegs=2 ErrMeas=0.071
nSegRange=15
15=1*15+0*7 totSegs=1 ErrMeas=0.050
nSegRange=16
16=−5*15+13*7 totSegs=18 ErrMeas=0.212
16=2*15+−2*7 totSegs=4 ErrMeas=0.100
16=0*15+1*7+0*13+0*17+1*9+0*5 GSegs=1 ASegs=1 totSegs=2
nSegRange=17
17=−4*15+11*7 totSegs=15 ErrMeas=0.194
17=3*15+−4*7 totSegs=7 ErrMeas=0.132
17=0*15+0*7+0*13+1*17+0*9+0*5 GSegs=0 ASegs=1 totSegs=1
nSegRange=18
18=−3*15+9*7 totSegs=12 ErrMeas=0.173
18=4*15+−6*7 totSegs=10 ErrMeas=0.158
18=0*15+0*7+0*13+0*17+2*9+0*5 GSegs=0 ASegs=2 totSegs=2
nSegRange=19
19=−2*15+7*7 totSegs=9 ErrMeas=0.150
19=5*15+−8*7 totSegs=13 ErrMeas=0.180
19=−1*15+0*7+0*13+2*17+0*9+0*5 GSegs=1 ASegs=2 totSegs=3
nSegRange=20
20=−1*15+5*7 totSegs=6 ErrMeas=0.122
20=6*15+−10*7 totSegs=16 ErrMeas=0.200
20=0*15+1*7+1*13+0*17+0*9+0*5 GSegs=1 ASegs=1 totSegs=2
nSegRange=21
21=0*15+3*7 totSegs=3 ErrMeas=0.087
nSegRange=22
22=1*15+1*7 totSegs=2 ErrMeas=0.071
nSegRange=23
23=−5*15+14*7 totSegs=19 ErrMeas=0.218
23=2*15+−1*7 totSegs=3 ErrMeas=0.087
nSegRange=24
24=−4*15+12*7 totSegs=16 ErrMeas=0.200
24=3*15+−3*7 totSegs=6 ErrMeas=0.122
24=0*15+1*7+0*13+1*17+0*9+0*5 GSegs=1 ASegs=1 totSegs=2
nSegRange=25
25=−3*15+10*7 totSegs=13 ErrMeas=0.180
25=4*15+−5*7 totSegs=9 ErrMeas=0.150
25=0*15+0*7+0*13+2*17+−1*9+0*5 GSegs=0 ASegs=3 totSegs=3
nSegRange=26
26=−2*15+8*7 totSegs=10 ErrMeas=0.158
26=5*15+−7*7 totSegs=12 ErrMeas=0.173
26=0*15+0*7+0*13+1*17+1*9+0*5 GSegs=0 ASegs=2 totSegs=2
nSegRange=27
27=−1*15+6*7 totSegs=7 ErrMeas=0.132
27=6*15+−9*7 totSegs=15 ErrMeas=0.194
27=0*15+−1*7+0*13+2*17+0*9+0*5 GSegs=1 ASegs=2 totSegs=3
nSegRange=28
28=0*15+4*7 totSegs=4 ErrMeas=0.100
28=1*15+0*7+1*13+0*17+0*9+0*5 GSegs=1 ASegs=1 totSegs=2
nSegRange=29
29=1*15+2*7 totSegs=3 ErrMeas=0.087
nSegRange=30
30=2*15+0*7 totSegs=2 ErrMeas=0.071
nSegRange=31
31=−4*15+13*7 totSegs=17 ErrMeas=0.206
31=3*15+−2*7 totSegs=5 ErrMeas=0.112
31=0*15+0*7+0*13+1*17+1*9+1*5 GSegs=0 ASegs=3 totSegs=3
nSegRange=32
32=−3*15+11*7 totSegs=14 ErrMeas=0.187
32=4*15+−4*7 totSegs=8 ErrMeas=0.141
32=1*15+0*7+0*13+1*17+0*9+0*5 GSegs=1 ASegs=1 totSegs=2
nSegRange=33
33=−2*15+9*7 totSegs=11 ErrMeas=0.166
33=5*15+−6*7 totSegs=11 ErrMeas=0.166
33=0*15+1*7+0*13+1*17+1*9+0*5 GSegs=1 ASegs=2 totSegs=3
nSegRange=34
34=−1*15+7*7 totSegs=8 ErrMeas=0.141
34=6*15+−8*7 totSegs=14 ErrMeas=0.187
34=0*15+0*7+0*13+2*17+0*9+0*5 GSegs=0 ASegs=2 totSegs=2
nSegRange=35
35=0*15+5*7 totSegs=5 ErrMeas=0.112
35=0*15+0*7+0*13+1*17+2*9+0*5 GSegs=0 ASegs=3 totSegs=3
nSegRange=36
36=1*15+3*7 totSegs=4 ErrMeas=0.100
nSegRange=37
37=2*15+1*7 totSegs=3 ErrMeas=0.087
nSegRange=38
38=−4*15+14*7 totSegs=18 ErrMeas=0.212
38=3*15+−1*7 totSegs=4 ErrMeas=0.100
nSegRange=39
39=−3*15+12*7 totSegs=15 ErrMeas=0.194
39=4*15+−3*7 totSegs=7 ErrMeas=0.132
39=0*15+0*7+0*13+2*17+0*9+1*5 GSegs=0 ASegs=3 totSegs=3
nSegRange=40
40=−2*15+10*7 totSegs=12 ErrMeas=0.173
40=5*15+−5*7 totSegs=10 ErrMeas=0.158
40=0*15+−1*7+1*13+2*17+0*9+0*5 GSegs=1 ASegs=3 totSegs=4
nSegRange=41
41=−1*15+8*7 totSegs=9 ErrMeas=0.150
41=6*15+−7*7 totSegs=13 ErrMeas=0.180

41=0*15+1*7+0*13+2*17+0*9+0*5 GSegs=1 ASegs=2 totSegs=3
nSegRange=42
42=0*15+6*7 totSegs=6 ErrMeas=0.122
42=0*15+0*7+0*13+3*17+−1*9+0*5GSegs=0 ASegs=4 totSegs=4
nSegRange=43
43=1*15+4*7 totSegs=5 ErrMeas=0.112
43=0*15+0*7+0*13+2*17+1*9+0*5GSegs=0 ASegs=3 totSegs=3
nSegRange=44
44=2*15+2*7 totSegs=4 ErrMeas=0.100
nSegRange=45
45=3*15+0*7 totSegs=3 ErrMeas=0.087
nSegRange=46
46=−3*15+13*7 totSegs=16 ErrMeas=0.200
46=4*15+−2*7 totSegs=6 ErrMeas=0.122
46=0*15+0*7+0*13+3*17+0*9+−1*5 GSegs=0 ASegs=4 totSegs=4
nSegRange=47
47=−2*15+11*7 totSegs=13 ErrMeas=0.180
47=5*15+−4*7 totSegs=9 ErrMeas=0.150
47=0*15+0*7+1*13+2*17+0*9+0*5 GSegs=0 ASegs=3 totSegs=3
nSegRange=48
48=−1*15+9*7 totSegs=10 ErrMeas=0.158
48=6*15+−6*7 totSegs=12 ErrMeas=0.173
48=0*15+0*7+0*13+2*17+1*9+1*5 GSegs=0 ASegs=4 totSegs=4
nSegRange=49
49=0*15+7*7 totSegs=7 ErrMeas=0.132
49=1*15+0*7+0*13+2*17+0*9+0*5GSegs=1 ASegs=2 totSegs=3
nSegRange=50
50=1*15+5*7 totSegs=6 ErrMeas=0.122
50=0*15+1*7+0*13+2*17+1*9+0*5 GSegs=1 ASegs=3 totSegs=4
nSegRange=51
51=2*15+3*7 totSegs=5 ErrMeas=0.112
51=0*15+0*7+0*13+3*17+0*9+0*5 GSegs=0 ASegs=3 totSegs=3
nSegRange=52
52=3*15+1*7 totSegs=4 ErrMeas=0.100
nSegRange=53
53=−3*15+14*7 totSegs=17 ErrMeas=0.206
53=4*15+−1*7 totSegs=5 ErrMeas=0.112
nSegRange=54
54=−2*15+12*7 totSegs=14 ErrMeas=0.187
54=5*15+−3*7 totSegs=8 ErrMeas=0.141
54=0*15+1*7+1*13+2*17+0*9+0*5GSegs=1 ASegs=3 totSegs=4
nSegRange=55
55=−1*15+10*7 totSegs=11 ErrMeas=0.166
55=6*15+−5*7 totSegs=11 ErrMeas=0.166
55=0*15+0*7+−1*13+4*17+0*9+0*5 GSegs=0 ASegs=5 totSegs=5
nSegRange=56
56=0*15+8*7 totSegs=8 ErrMeas=0.141
56=0*15+0*7+0*13+3*17+0*9+1*5 GSegs=0 ASegs=4 totSegs=4
nSegRange=57
57=1*15+6*7 totSegs=7 ErrMeas=0.132
57=0*15+−1*7+1*13+3*17+0*9+0*5 GSegs=1 ASegs=4 totSegs=5
nSegRange=58
58=2*15+4*7 totSegs=6 ErrMeas=0.122
58=0*15+1*7+0*13+3*17+0*9+0*5 GSegs=1 ASegs=3 totSegs=4
nSegRange=59
59=3*15+2*7 totSegs=5 ErrMeas=0.112
nSegRange=60
60=4*15+0*7 totSegs=4 ErrMeas=0.100
nSegRange=61
61=−2*15+13*7 totSegs=15 ErrMeas=0.194
61=5*15+−2*7 totSegs=7 ErrMeas=0.132
61=0*15+−1*7+0*13+4*17+0*9+0*5 GSegs=1 ASegs=4 totSegs=5
nSegRange=62
62=−1*15+11*7 totSegs=12 ErrMeas=0.173
62=6*15+−4*7 totSegs=10 ErrMeas=0.158
62=1*15+0*7+1*13+2*17+0*9+0*5 GSegs=1 ASegs=3 totSegs=4
nSegRange=63
63=0*15+9*7 totSegs=9 ErrMeas=0.150
63=0*15+0*7+0*13+4*17+0*9+−1*5 GSegs=0 ASegs=5 totSegs=5
nSegRange=64
64=1*15+7*7 totSegs=8 ErrMeas=0.141
64=0*15+0*7+1*13+3*17+0*9+0*5 GSegs=0 ASegs=4 totSegs=4
nSegRange=65
65=2*15+5*7 totSegs=7 ErrMeas=0.132
65=0*15+0*7+0*13+3*17+1*9+1*5 GSegs=0 ASegs=5 totSegs=5
nSegRange=66
66=3*15+3*7 totSegs=6 ErrMeas=0.122
66=1*15+0*7+0*13+3*17+0*9+0*5 GSegs=1 ASegs=3 totSegs=4
nSegRange=67
67=4*15+1*7 totSegs=5 ErrMeas=0.112
nSegRange=68
68=−2*15+14*7 totSegs=16 ErrMeas=0.200
68=5*15+−1*7 totSegs=6 ErrMeas=0.122
68=0*15+0*7+0*13+4*17+0*9+0*5 GSegs=0 ASegs=4 totSegs=4
nSegRange=69
69=−1*15+12*7 totSegs=13 ErrMeas=0.180
69=6*15+−3*7 totSegs=9 ErrMeas=0.150
69=0*15+0*7+0*13+3*17+2*9+0*5 GSegs=0 ASegs=5 totSegs=5
nSegRange=70
70=0*15+10*7 totSegs=10 ErrMeas=0.158
70=−1*15+0*7+0*13+5*17+0*9+0*5 GSegs=1 ASegs=5 totSegs=6
nSegRange=71
71=1*15+8*7 totSegs=9 ErrMeas=0.150
71=0*15+1*7+1*13+3*17+0*9+0*5 GSegs=1 ASegs=4 totSegs=5
nSegRange=72
72=2*15+6*7 totSegs=8 ErrMeas=0.141
72=0*15+0*7+−1*13+5*17+0*9+0*5 GSegs=0 ASegs=6 totSegs=6
nSegRange=73
73=3*15+4*7 totSegs=7 ErrMeas=0.132
73=0*15+0*7+0*13+4*17+0*9+1*5GSegs=0 ASegs=5 totSegs=5
nSegRange=74
74=4*15+2*7 totSegs=6 ErrMeas=0.122
nSegRange=75
75=5*15+0*7 totSegs=5 ErrMeas=0.112
nSegRange=76
76=−1*15+13*7 totSegs=14 ErrMeas=0.187
76=6*15+−2*7 totSegs=8 ErrMeas=0.141

76=0*15+0*7+0*13+5*17+−1*9+0*5    GSegs=0
    ASegs=6 totSegs=6
nSegRange=77
77=0*15+11*7 totSegs=11 ErrMeas=0.166
77=0*15+0*7+0*13+4*17+1*9+0*5 GSegs=0 ASegs=5
    totSegs=5
nSegRange=78
78=1*15+9*7 totSegs=10 ErrMeas=0.158
78=0*15+−1*7+0*13+5*17+0*9+0*5 GSegs=1 ASegs=5
    totSegs=6
nSegRange=79
79=2*15+7*7 totSegs=9 ErrMeas=0.150
79=1*15+0*7+1*13+3*17+0*9+0*5 GSegs=1 ASegs=4
    totSegs=5
nSegRange=80
80=3*15+5*7 totSegs=8 ErrMeas=0.141
80=0*15+0*7+0*13+5*17+0*9+−1*5    GSegs=0
    ASegs=6 totSegs=6
nSegRange=81
81=4*15+3*7 totSegs=7 ErrMeas=0.132
81=0*15+0*7+1*13+4*17+0*9+0*5 GSegs=0 ASegs=5
    totSegs=5
nSegRange=82
82=5*15+1*7 totSegs=6 ErrMeas=0.122
nSegRange=83
83=−1*15+14*7 totSegs=15 ErrMeas=0.194
83=6*15+−1*7 totSegs=7 ErrMeas=0.132
83=1*15+0*7+0*13+4*17+0*9+0*5 GSegs=1 ASegs=4
    totSegs=5
nSegRange=84
84=0*15+12*7 totSegs=12 ErrMeas=0.173
84=0*15+1*7+0*13+4*17+1*9+0*5 GSegs=1 ASegs=5
    totSegs=6
nSegRange=85
85=1*15+10*7 totSegs=11 ErrMeas=0.166
85=0*15+0*7+0*13+5*17+0*9+0*5 GSegs=0 ASegs=5
    totSegs=5
nSegRange=86
86=2*15+8*7 totSegs=10 ErrMeas=0.158
86=0*15+0*7+0*13+4*17+2*9+0*5 GSegs=0 ASegs=6
    totSegs=6
nSegRange=87
87=3*15+6*7 totSegs=9 ErrMeas=0.150
87=−1*15+0*7+0*13+6*17+0*9+0*5    GSegs=1
    ASegs=6 totSegs=7
nSegRange=88
88=4*15+4*7 totSegs=8 ErrMeas=0.141
88=0*15+1*7+1*13+4*17+0*9+0*5 GSegs=1 ASegs=5
    totSegs=6
nSegRange=89
89=5*15+2*7 totSegs=7 ErrMeas=0.132
nSegRange=90
90=6*15+0*7 totSegs=6 ErrMeas=0.122
nSegRange=91
91=0*15+13*7 totSegs=13 ErrMeas=0.180
91=0*15+−1*7+1*13+5*17+0*9+0*5    GSegs=1
    ASegs=6 totSegs=7
nSegRange=92
92=1*15+11*7 totSegs=12 ErrMeas=0.173
92=0*15+1*7+0*13+5*17+0*9+0*5 GSegs=1 ASegs=5
    totSegs=6
nSegRange=93
93=2*15+9*7 totSegs=11 ErrMeas=0.166
93=0*15+0*7+0*13+6*17+−1*9+0*5    GSegs=0
    ASegs=7 totSegs=7
nSegRange=94
94=3*15+7*7 totSegs=10 ErrMeas=0.158
94=0*15+0*7+0*13+5*17+1*9+0*5 GSegs=0 ASegs=6
    totSegs=6
nSegRange=95
95=4*15+5*7 totSegs=9 ErrMeas=0.150
95=0*15+−1*7+0*13+6*17+0*9+0*5    GSegs=1
    ASegs=6 totSegs=7
nSegRange=96
96=5*15+3*7 totSegs=8 ErrMeas=0.141
96=1*15+0*7+1*13+4*17+0*9+0*5 GSegs=1 ASegs=5
    totSegs=6
nSegRange=97
97=6*15+1*7 totSegs=7 ErrMeas=0.132
nSegRange=98
98=0*15+14*7 totSegs=14 ErrMeas=0.187
98=0*15+0*7+1*13+5*17+0*9+0*5 GSegs=0 ASegs=6
    totSegs=6
nSegRange=99
99=1*15+12*7 totSegs=13 ErrMeas=0.180
99=0*15+0*7+0*13+5*17+1*9+1*5 GSegs=0 ASegs=7
    totSegs=7
nSegRange=100
100=2*15+10*7 totSegs=12 ErrMeas=0.173
100=1*15+0*7+0*13+5*17+0*9+0*5    GSegs=1
    ASegs=5 totSegs=6

In some implementations, one or more portions of the components shown in the laser system 100 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the laser system 100 can be, or can include, a software module configured for execution by at least one processor (not shown). In some implementations, the functionality of the components can be included in different modules and/or different components than those shown in FIG. 1.

In some embodiments, one or more of the components of the laser system 100 can be, or can include, processors configured to process instructions stored in a memory. For example, the analyzer 170 (and/or a portion thereof) can be a combination of a processor and a memory configured to execute instructions related to a process to implement one or more functions.

Although not shown, in some implementations, the components of the laser system 100 (or portions thereof) can be configured to operate within, for example, a data center (e.g., a cloud computing environment), a computer system, one or more server/host devices, and/or so forth. In some implementations, the components of the laser system 100 (or portions thereof) can be configured to operate within a network. Thus, the laser system 100 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, a memory can be any type of memory such as a random-access memory, a disk drive memory, flash memory, and/or so forth. In some implementations, the memory can be implemented as more than one memory component (e.g., more than one RAM component or disk drive memory) associated with the components of the laser system 100.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A non-transitory computer-readable storage medium storing instructions that when executed cause a processor to perform a process, the process comprising:
   producing a segment of a laser signal, the segment of the laser signal having a duration;
   producing a first reference signal based on the laser signal;
   calculating a first phase deviation corresponding with a first portion of the duration based on the first reference signal;
   producing a second reference signal based on the laser signal;
   calculating a second phase deviation corresponding with a second portion of the duration based on the second reference signal; and
   calculating a phase deviation of the segment of the laser signal based on a combination of the first phase deviation and the second phase deviation.

2. The non-transitory computer-readable storage medium of claim 1, wherein the duration corresponds with a round-trip time period of the laser signal to a target object.

3. The non-transitory computer-readable storage medium of claim 1, wherein the first portion of the duration and the second portion of the duration occur during mutually exclusive time periods.

4. The non-transitory computer-readable storage medium of claim 1, wherein the combination is a sum.

5. The non-transitory computer-readable storage medium of claim 1, wherein the combination is a difference.

6. A method, comprising:
   producing a laser signal;
   analyzing a reflected signal of the laser signal based on a sampling time period;
   producing a first reference signal based on the laser signal and a first delay duration, the first delay duration being an integer multiple of the sampling time period;
   calculating a phase deviation associated with the first delay duration based on the first reference signal; and
   producing a second reference signal based on the laser signal and a second delay duration different from the first delay duration.

7. The method of claim 6, wherein the phase deviation is a first phase deviation,
the method further comprising:
calculating a second phase deviation associated with the second delay duration based on the second reference signal; and
calculating a round-trip phase deviation of the laser signal using the first phase deviation and the second phase deviation.

8. The method of claim 6, wherein the phase deviation is a first phase deviation,
the method further comprising:
calculating a second phase deviation associated with the second delay duration based on the second reference signal; and
calculating a phase deviation of the laser signal, the phase deviation being associated with a round-trip duration equal to or greater than a sum of the first delay duration and the second delay duration based on a summation of the first phase deviation and the second phase deviation.

9. The method of claim 6, wherein the phase deviation is a first phase deviation,
the method further comprising:
calculating a second phase deviation associated with the second delay duration based on the second reference signal; and
calculating a phase deviation of the laser signal, the phase deviation being associated with a round-trip duration less than a sum of the first delay duration and the second delay duration based on a difference between the first phase deviation and the second phase deviation.

10. The method of claim 6, further comprising:
determining a round-trip duration associated with the laser signal based on a range to a target object; and
estimating a residual phase deviation of a portion of the laser signal corresponding with a difference between and the round-trip duration and a sum of the first delay duration and the second delay duration.

11. The method of claim 6, wherein the integer multiple of the sampling period is a first integer multiple of the sampling period, the second delay duration is a second integer multiple of the sampling time period.

12. The method of claim 11, wherein the first integer multiple and the second integer multiple do not have a common factor.

13. The method of claim 11, wherein the first integer multiple is a prime number, the second integer multiple is a prime number.

14. An apparatus, comprising:
a laser source configured to produce a laser signal;
a receiver configured to analyze, based on a sampling time period, a reflected signal from the laser signal;
a first reference module including a first delay and configured to produce a first reference signal based on the laser signal;
a phase detector configured to detect a phase deviation associated with a duration produced by the first delay;
a second reference module including a second delay and configured to produce a second reference signal based on the laser signal; and
a phase detector configured to detect a phase deviation associated with a duration produced by the second delay, the duration produced by the first delay being different from the duration produced by the second delay by an integer multiple of the sampling time period.

15. The apparatus of claim 14, wherein the duration of the first delay is an integer multiple of the sampling period.

* * * * *